United States Patent
Zhang et al.

(10) Patent No.: US 9,580,342 B2
(45) Date of Patent: Feb. 28, 2017

(54) METHOD FOR COOPERATIVE CONTROL OF MICROCYSTIS AERUGINOSA BY USING CHUB, BIGHEAD, CATFISH AND DAPHNIA

(71) Applicant: Nanjing Institute of Environmental Sciences, Ministry of Evironmental Protection, Nanjing (CN)

(72) Inventors: Yimin Zhang, Nanjing (CN); Han Wu, Nanjing (CN); Yuexiang Gao, Nanjing (CN); Fei Yang, Nanjing (CN); Longmian Wang, Nanjing (CN); Chuang Zhou, Nanjing (CN)

(73) Assignee: Nanjing Institute of Environmental Sciences, Ministry of Environmental Protection, Nanjing (CN)

( * ) Notice: Subject to any disclaimer, the term of this patent is extended or adjusted under 35 U.S.C. 154(b) by 0 days.

(21) Appl. No.: 14/749,542

(22) Filed: Jun. 24, 2015

(65) Prior Publication Data
US 2016/0376179 A1 Dec. 29, 2016

(51) Int. Cl.
C02F 3/32 (2006.01)
C02F 103/00 (2006.01)

(52) U.S. Cl.
CPC ........ C02F 3/327 (2013.01); *C02F 2103/007* (2013.01)

(58) Field of Classification Search
CPC .......................... C02F 3/327; C02F 2103/007
USPC ....................................................... 210/602
See application file for complete search history.

(56) References Cited

U.S. PATENT DOCUMENTS

| | | | | | |
|---|---|---|---|---|---|
| 1,643,273 | A | * | 9/1927 | Imhoff | A01K 61/00 119/228 |
| 3,635,816 | A | * | 1/1972 | Golub | C02F 3/327 119/226 |
| 5,254,254 | A | * | 10/1993 | Shin | C02F 3/06 210/616 |
| 6,447,681 | B1 | * | 9/2002 | Carlberg | A01K 63/04 119/227 |
| 6,827,855 | B2 | * | 12/2004 | Jennings | C02F 3/32 119/227 |
| 8,677,942 | B2 | * | 3/2014 | Bodlovich | C02F 3/32 119/226 |

\* cited by examiner

*Primary Examiner* — Fred Prince
(74) *Attorney, Agent, or Firm* — Tian IP & Technology, LLC.

(57) ABSTRACT

The present disclosure relates to methods for cooperative control of *microcystis aeruginosa* by using chub, bighead, catfish and daphnia, and belongs to the technical field of water treatment. The *microcystis aeruginosa* in a water body is controlled using a food chain relationship; the chub, the bighead, the catfish and the daphnia can directly eat the *microcystis aeruginosa* in a filtering manner; and meanwhile, the chub, the bighead and the catfish also can intake the daphnia, so as to indirectly consume the *microcystis aeruginosa* in the water body, wherein the fishes, the daphnia and the *microcystis aeruginosa* form the food chain relationship; in addition, the *microcystis aeruginosa* at the upper, middle and lower layers and a *microcystis aeruginosa* hypopus at the bottom layer can be controlled by fully utilizing the vertical spatial distribution difference of the three fishes in the water body.

4 Claims, No Drawings

METHOD FOR COOPERATIVE CONTROL OF MICROCYSTIS AERUGINOSA BY USING CHUB, BIGHEAD, CATFISH AND DAPHNIA

TECHNICAL FIELD

The present disclosure belongs to the technical field of water treatment, and particularly, to a method for controlling *microcystis aeruginosa*, and more particularly, to a method for cooperative control of *microcystis aeruginosa* by using chub, bighead, catfish and daphnia magna.

BACKGROUND

"Water blooms" (algas in water body) have become a global environmental issue, and cause great harm to the utilization of water resources, for example, drop of dissolved oxygen in water, and threat of algal toxins released by algas to biological lives or the like, wherein *microcystis aeruginosa* is the major species of "water blooms", which is dominant in quantity and outbreak frequencies. How to control the *microcystis aeruginosa* becomes a difficult problem for more and more scientists and researchers to solve Lake Eutrophication.

There are many methods for removing algas at present, wherein mechanical alga removal can quickly and effectively remove the algas and algal tufa in the water in a short term, but consume a lot of human and material resources; and chemical alga removal can also kill the algas quickly, but the secondary pollution caused by the dead algas as well as the biological concentration and biological magnification of chemicals cause larger negative influences to the entire ecological system. In recent years, non-traditional biomanipulation technology has been widely applied in Lake Eutrophication treatment. For example, Chinese patent (No. 200710071818.2) discloses an inventive patent titled as bighead carp, grass carp, cladophora and daphnia hyaline multi-biology cooperated algae control method. The method according to the disclosure includes the following steps of: putting bighead and grass carp in an eutrophication water body, the putting proportion of the bighead and the grass carp is 3:1~4:1; placing floating cages in the eutrophication water body, with cladophora adhered on the cages; and putting daphnia hyalina in the cages. According to the disclosure, the bighead and the grass carp eat the algas in the eutrophication water body in a filtering manner, and the cladophora removes the nutrients in the water body; therefore, the objects of controlling the contents of algas in the raw water, reducing the trophic level of the raw water, and facilitating conventional treatment of tap water are achieved. For another example, Chinese patent (No. 200910197309.3) discloses a control method for alga control method for freshwater environment based on cultivation of barracudas and mullets, which introduces one of estuarine and oceanographic fishes like barracudas and mullets which can be only propagated in seawater with respect to the problem that the algas in the eutrophication water body and freshwater body cannot be stably and thoroughly controlled, and brings nitrogen and phosphorus nutrients in the water and humic substances in bottom materials out of the water body through harvesting the hydrobiontes propagated via cultivating. Chinese patent (No. 200710151009.2) discloses a technical method for silver carp and hyriopsis cumingii combined algae-controlling, which removes the nutritive salt in a water body like nitrogen, phosphorus or the like through the cooperative effects of chub and hyriopsis cumingii for controlling algas.

The above non-traditional biomanipulation technology can remove cyanophytes, but cannot control the cyanophytes in each water zone. Moreover, excrements of these fishes still contain some undigested cyanophytes which will grow again in case of being sedimentated into the bottom layer of the water body; therefore, the removal effect thereof is not ideal. Although biological alga removal can be derived in the art, the core problem above is that these methods cannot achieve long term ecological balance, while this is just the difficult aspect to control for biological alga removal because the most difficult point to artificially establish and control an ecological environment is whether the algas can be removed for a long term rather than whether the algas can be removed. An optional scheme is to control the cyanophytes within a reasonable range, prompting the put organisms and cyanophytes to form a complete ecological chain, which is the key of the technology. Moreover, the control systems for different organisms are different as well, and seldom reports can be found in the existing literatures, which leads to fewer actual engineering application examples to control the *microcystis aeruginosa* by using organisms.

DETAILED DESCRIPTION

With respect to the problems that the prior art has certain threaten to the ecological balance of the water body, cannot effectively remove the algas in each water zone of the water body, and especially cannot effectively remove and suppress the *microcystis aeruginosa* for a long term, the present disclosure provides a method for cooperative control of *microcystis aeruginosa* by using chub, bighead, catfish and daphnia, which can establish a stable ecological balance, not only can realize all-aspect cooperative control of *microcystis aeruginosa* in different depth of the water body, but also can form beneficial ecological regulation.

In order to solve the foregoing problems, the disclosure employs the following technical solutions: a method for cooperative control of *microcystis aeruginosa* by using chub, bighead, catfish and daphnia includes the following steps: (a) selecting an eutrophication water domain, wherein total nitrogen (TN), total phosphorus (TP) and chlorophyll indexes in the water satisfy the following requirements: 1.2 mg/L<TN<2.7 mg/L, 0.05 mg/L<TP<0.1 mg/L, 11 mg/m$^3$<chlorophyll<78 mg/m$^3$, and the maximum depth does not exceed 3 m, and the flow rate of a water flow is 0~0.1 m/s; and (b) putting chub, bighead, catfish and daphnia according to the volume of the water body, wherein the density of the chub is 60~300 g/m$^3$, the density of the bighead is 20~80 g/m$^3$, the density of the catfish is 40~160 g/m$^3$, the density of the daphnia is 30~50 daphnia/L, and the weight of a single chub put is 60~150 g, the weight of a single bighead is 40~100 g, and the weight of a single catfish is 50~80 g.

In some embodiments, the daphnia is daphnia magna. In some embodiments, the mass ratio of the chub, the bighead and the catfish is 3~4:1:2.

Since water pollution causes are diverse and have great differences, and particularly, each difference water domain condition requires a specific solution, the specific fishes selected by the present disclosure are direct to a treatment solution that the TN, TP and chlorophyll indexes in the water satisfy certain requirements. According to the present disclosure, a specific disclosure with respect to a specifically determined organism put volume is selected according to a specific water quality environment, which solves the problem that the *microcystis aeruginosa* under this water quality is relatively difficult to remove, and particularly a treatment solution that can continuously suppress the growth of the algas and form a stable ecological system is designed.

Compared with the prior art, the present disclosure has the following advantageous effects. The present disclosure achieves effective control of the *microcystis aeruginosa* at the upper, middle and lower layers and a *microcystis aeruginosa* hypopus at the bottom mud by utilizing the vertical spatial distribution of chub, bighead and catfish in the water body from top to bottom in sequence; the daphnia magna eats the *microcystis aeruginosa*; the chub, the bighead and the catfish eat the daphnia magna and the *microcystis aeruginosa*; moreover, since the catfish has a well-developed keratin edge in front of the lower jaw, the catfish can sufficiently scrape and eat the humic substances, bottom mud and *microcystis aeruginosa* that can pollute the water quality; meanwhile, when the *microcystis aeruginosa* is too little, the chub, the bighead and the catfish will take the daphnia magna as the main food to reduce the inventory of the daphnia magna and decrease the growth pressure of the *microcystis aeruginosa* so as to promote the growth of the *microcystis aeruginosa*; however, if the *microcystis aeruginosa* is too much, it will prompt the quick and mass propagation of the daphnia magna, then the chub, the bighead, the catfish and the daphnia magna eat the *microcystis aeruginosa* so as to reduce the content of the *microcystis aeruginosa*; after the content of the *microcystis aeruginosa* is reduced to a certain extent, the chub, the bighead and the catfish will eat redundant daphnia magna to form a virtuous circle; the chub, the bighead, the catfish, the daphnia magna and the *microcystis aeruginosa* will form a food chain relationship, and the mass growth of the *microcystis aeruginosa* can be effectively controlled through keeping an excellent balance relationship of the food chain.

The content of the *microcystis aeruginosa* in the water body can be more effectively controlled, an eutrophication level is reduced, a balance of an ecological system of the water body is facilitated, and meanwhile, a certain economic value can be obtained by catching the chub, the bighead and the catfish. The method according to the present disclosure has the advantages of low cost, simplicity, feasibility, no secondary pollution and the like.

The excrements of the chub and the bighead employed in the present disclosure contain undigested *microcystis aeruginosa*, and the catfish at the bottom layer can eat the excrements of the chub and the bighead, so as to further digest the *microcystis aeruginosa* in the excrements; therefore, the problems of mass growth of small-size algas and increasing of total alga level caused by simply employing chub and bighead are overcome, the increasing effect of the excrement on the nutritive salt in the water body is effectively suppressed, and the nutrient sources required for the growth of the *microcystis aeruginosa* is reduced to a certain extent.

The present disclosure has the characteristics of low cost, simple management, durable effect and no secondary pollution and the like; and meanwhile, parts of nitrogen and phosphorus nutriments can be brought out of the water body through harvesting the chub, the bighead and the catfish, which can gain a certain economic value.

The present disclosure can effectively control the *microcystis aeruginosa* at the upper, middle and lower layers and the *microcystis aeruginosa* hypopus at the bottom mud.

In a specific water domain selected according to the present disclosure, the density of the chub put is 60~300 g/m$^3$, the density of the bighead is 20~80 g/m$^3$, the density of the catfish is 40~160 g/m$^3$, the density of the daphnia magna is 30~50 daphnia/L, the weight of a single chub put is 60~150 g, the weight of a single bighead is 40~100 g, and the weight of a single catfish is 50~80 g; in this way, the virtuous circle can be kept all the time to maintain an ecological stability.

EXAMPLE 1

In an eutrophication water domain, the water depth is 2.6 m, the flow rate is 0.5 m/s, and the concentrations of TN, TP and chlorophyll in the water body are respectively that TN=1.2 mg/L, TP=0.05 mg/L, and chlorophyll=12 mg/m$^3$, the density of chub put is 60 g/m$^3$, the density of bighead is 20 g/m$^3$, the density of catfish is 40 g/m$^3$, the weight of a single chub is 60~150 g, the weight of a single bighead is 40~120 g, the weight of a single catfish is 50~80 g, and the density of daphnia magna is 30/L. After a period of time, each water body index in the water body keeps stable relatively, and the removal rates of TN, TP and chlorophyll are respectively 31%, 24% and 64%. After continuously running for two years, the amount of each organism in the water still keeps stable.

EXAMPLE 2

In an eutrophication water domain, the water depth is 3 m, the flow rate is 0.3 m/s, and the concentrations of TN, TP and chlorophyll in the water body are respectively that TN=1.6 mg/L, TP=0.06 mg/L, and chlorophyll=26 mg/m$^3$, the density of chub put is 90 g/m$^3$, the density of bighead is 30 g/m$^3$, the density of catfish is 60 g/m$^3$, the weight of a single chub is 60~150 g, the weight of a single bighead is 40~120 g, the weight of a single catfish is 50~80 g, and the density of daphnia magna is 35/L. After a period of time, each water body index in the water body keeps stable relatively, and the removal rates of TN, TP and chlorophyll are respectively 34%, 26% and 68%. After continuously running for two years, the amount of each organism in the water still keeps stable.

EXAMPLE 3

In an eutrophication water domain, the water depth is 2 m, the flow rate is 0.7 m/s, and the concentrations of TN, TP and chlorophyll in the water body are respectively that TN=1.9 mg/L, TP=0.06 mg/L, and chlorophyll=48 mg/m$^3$, the density of chub put is 150 g/m$^3$, the density of bighead is 35 g/m$^3$, the density of catfish is 70 g/m$^3$, the weight of a single chub is 60~150 g, the weight of a single bighead is 40~120 g, the weight of a single catfish is 50~80 g, and the density of daphnia magna is 40/L. After a period of time, each water body index in the water body keeps stable relatively, and the removal rates of TN, TP and chlorophyll are respectively 29%, 31% and 71%. After continuously running for two years, the amount of each organism in the water still keeps stable.

EXAMPLE 4

In an eutrophication water domain, the water depth is 3 m, the flow rate is 0.8 m/s, and the concentrations of TN, TP and chlorophyll in the water body are respectively that TN=2.3 mg/L, TP=0.08 mg/L, and chlorophyll=53 mg/m$^3$, the density of chub put is 210 g/m$^3$, the density of bighead is 60 g/m$^3$, the density of catfish is 120 g/m$^3$, the weight of a single chub is 60~150 g, the weight of a single bighead is 40~120 g, the weight of a single catfish is 50~80 g, and the density of daphnia magna is 43/L. After a period of time, each water body index in the water body keeps stable relatively, and the removal rates of TN, TP and chlorophyll are respectively 23%, 28% and 75%. After continuously running for two years, the amount of each organism in the water still keeps stable.

EXAMPLE 5

In an eutrophication water domain, the water depth is 1.8 m, the flow rate is 1 m/s, and the concentrations of TN, TP and chlorophyll in the water body are respectively that TN=2.7 mg/L, TP=0.09 mg/L, and chlorophyll=67 mg/m$^3$, the density of chub put is 300 g/m$^3$, the density of bighead is 70 g/m$^3$, the density of catfish is 140 g/m$^3$, the weight of a single chub is 60~150 g, the weight of a single bighead is 40~120 g, the weight of a single catfish is 50~80 g, and the density of daphnia magna is 47/L. After a period of time, each water body index in the water body keeps stable relatively, and the removal rates of TN, TP and chlorophyll are respectively 36%, 31% and 68%. After continuously running for three years, the amount of each organism in the water still keeps stable.

EXAMPLE 6

In an eutrophication water domain, the water depth is 1.6 m, the flow rate is 1 m/s, and the concentrations of TN, TP and chlorophyll in the water body are respectively that TN=2.5 mg/L, TP=0.06 mg/L, and chlorophyll=78 mg/m$^3$, the density of chub put is 260 g/m$^3$, the density of bighead is 80 g/m$^3$, the density of catfish is 160 g/m$^3$, the weight of a single chub is 60~150 g, the weight of a single bighead is 40~120 g, the weight of a single catfish is 50~80 g, and the density of daphnia magna is 50/L. After a period of time, each water body index in the water body keeps stable relatively, and the removal rates of TN, TP and chlorophyll are respectively 24%, 27% and 64%. After continuously running for two years, the amount of each organism in the water still keeps stable.

What is claimed is:
1. A method for cooperative control of *microcystis aeruginosa* using chubs, bigheads, catfishes and daphnia, comprising:
   selecting an eutrophication water domain, wherein total nitrogen (TN), total phosphorus (TP) and chlorophyll indexes in the water satisfy the following requirements: about 1.2 mg/L<TN<about 2.7 mg/L, about 0.05 mg/L<TP<about 0.1 mg/L, about 11 mg/m$^3$<chlorophyll<about 78 mg/m$^3$, and a maximum depth does not exceed about 3 meters, and a flow rate of a water flow is about 0~0.1 m/s; and
   putting the chubs, the bigheads, the catfishes and the daphnia according to a volume of a water body, wherein a density of the chubs is about 60~300 g/m$^3$, a density of the bigheads is about 20~80 g/m$^3$, a density of the catfishes is about 40~160 g/m$^3$, a density of the daphnia is about 30~50 daphnia/L, wherein the daphnia eats the *microcystis aeruginosa*, and the chub, the bighead and the catfish then eat the daphnia and the *microcystis aeruginosa*.
2. The method of claim 1, wherein a weight of an individual chub is about 60~150 g, a weight of an individual bighead is about 40~100 g, and a weight of an individual catfish is about 50~80 g.
3. The method of claim 1, wherein the daphnia is daphnia magna.
4. The method of claim 1, wherein a mass ratio between the chub, the bighead and the catfish is about 3~4:1:2.

* * * * *